May 9, 1944.  L. MANZANERA  2,348,401
APPARATUS FOR RECORDING WAVE FORM SIGNALS
Filed July 28, 1942
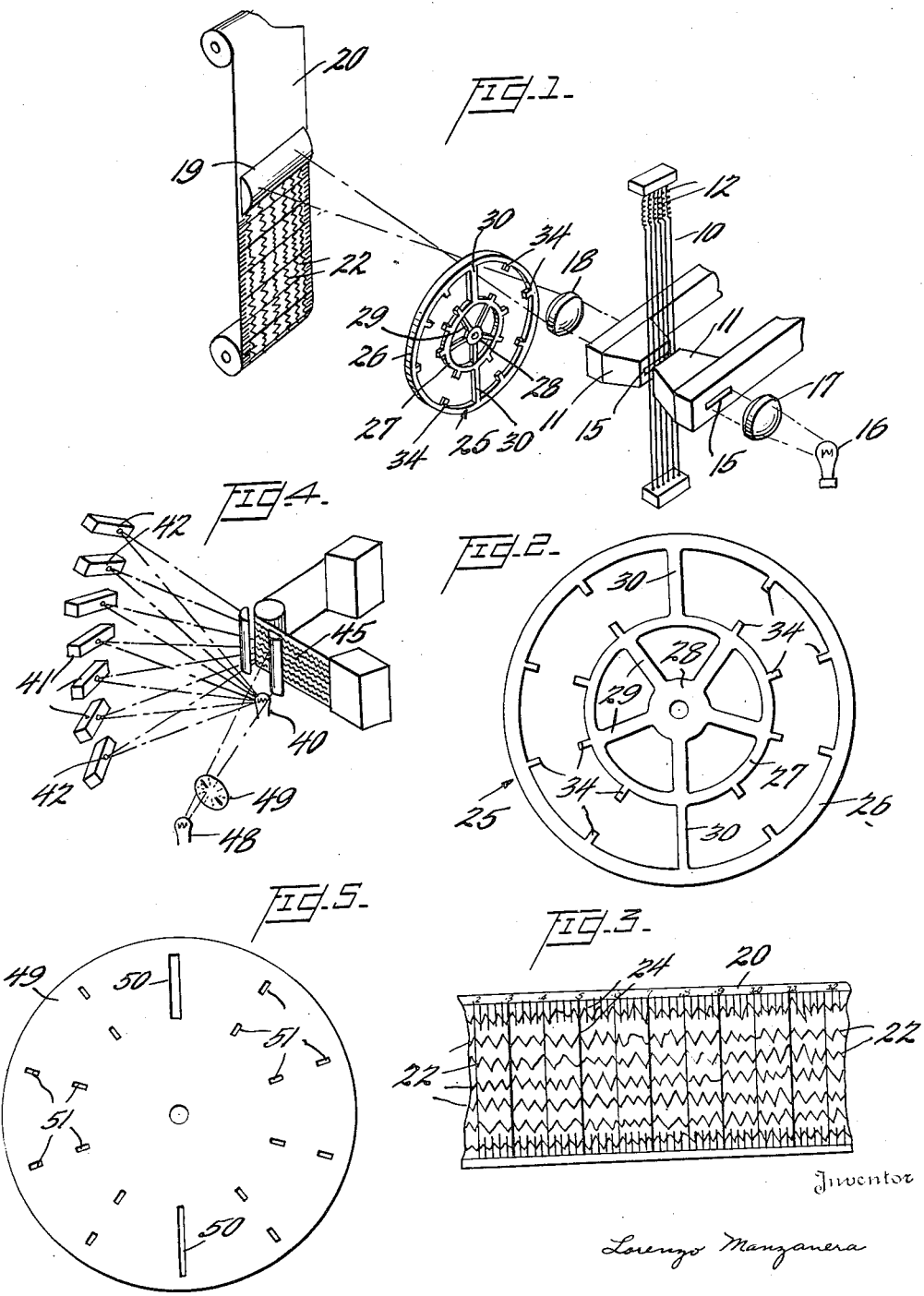

Patented May 9, 1944

2,348,401

UNITED STATES PATENT OFFICE 2,348,401

APPARATUS FOR RECORDING WAVE FORM SIGNALS

Lorenzo Manzanera, San Antonio, Tex., assignor to Olive S. Petty, San Antonio, Tex.

Application July 28, 1942, Serial No. 452,661

6 Claims. (Cl. 234—36)

This invention relates to the multiple recording of wave form signals, and has for an object the provision of an improved apparatus for forming timing lines on a sensitized record strip simultaneously with the exposure of the strip by light from a multiple oscillograph to form a plurality of traces extending lengthwise of the strip.

In multiple recording of the type to which this invention relates, for example as employed in the field of seismic surveying, in which the signals from a plurality of detectors or seismometers are simultaneously recorded on a sensitized strip, it is customary to associate with the recording means a device for so exposing the strip as to imprint thereon a plurality of timing lines, usually equally spaced, so that the instant of arrival of a given impulse at each of the several detectors or seismometers may readily be noted. Thus when an oscillograph of the multiple string type is employed, in which the strings are arranged in an optical system so as to cast shadows on the sensitized strip, the timing lines may conveniently be formed on the strip by the use of a moving shutter, usually in the form of a spoked wheel, which is so associated with the optical system as to cast a further shadow across the entire width of the strip at equal intervals of time, for example .05 second. When an oscillograph of the rotating coil type is employed, whereby the developed print of the strip is a positive, a separate source of light, interrupted by means of a rotating slitted shutter, is commonly used to form the timing lines by direct projection of a light beam on the strip.

I have found, however, that these timing lines often interfere with the record traces so as to render the latter obscure and difficult to interpret at critical points. To obviate this difficulty, I have provided means for so forming the timing lines that only a minor number thereof extend entirely across the strip, the remainder being interrupted so as to extend only partially toward the central part of the strip from each edge thereof. By so disposing the timing lines, I am enabled to reduce to a minimum the interference between the timing lines and the record traces without, however, adversely affecting the usefulness of the timing lines for their intended purposes. Again, it is sometimes the practice to draw in manually lines connecting related points on the wave traces to facilitate further computation, and additional confusion thus results when all of the timing lines are extended across the record.

Thus I have found that, in general, there is little need to form closely spaced timing lines on the record strip except in connection with the two outermost traces at the sides of the strip. If, as is occasionally the case, the arrival time of an intermediate trace is significant, the necessary extension of the timing lines may be effected manually after development of the strip, and the need for this is so infrequent that no considerable inconvenience results.

It is therefore the principal object of the instant invention to provide means for recording multiple oscillograph traces wherein the major number of the simultaneously recorded timing lines extend only over a minor part of the width of the record strip. More specifically, it is an object of the invention to provide timing apparatus for use in conjunction with a multiple oscillograph whereby certain only of the timing lines, recorded simultaneously with the oscillograph traces, extend entirely across the strip, the remainder of the timing lines extending inwardly from the strip from each edge partially across the strip, and to the extent necessary to intersect only the outermost traces at opposite sides of the strip.

Further objects and features of the invention will be apparent from the following description taken in connection with the accompanying drawing, in which:

Figure 1 is a perspective view of apparatus for practicing the invention in conjunction with an oscillograph of the string galvanometer type;

Fig. 2 is an enlarged view in elevation of the light occluding means or shutter of Figure 1 by means of which the timing lines are formed on the sensitized strip;

Figure 3 illustrates a portion of a record strip such as may be formed in the practice of the invention;

Figure 4 is a perspective view of an alternative embodiment of the invention, illustrating the application thereof to a multiple oscillograph of the rotating coil type; and Figure 5 is a view in elevation of the shutter employed in Figure 4.

In order to facilitate an understanding of the invention, reference will be made to the several embodiments thereof illustrated in the accompanying drawing and specific language will be employed. It will nevertheless be understood that various further modifications of the devices illustrated herein, such as would fall within the province of those skilled in the art to construct are contemplated as part of the present invention.

In Figures 1 of the drawing is represented a conventional oscillograph reproducing system. In this instance the oscillograph is of the multiple string type in which a plurality of strings 10 are supported in parallel relation intermediate the pole pieces 11 of an electromagnet, each of the strings being yieldingly supported, for example by means of coiled springs 12, so that it may vibrate transversely of the pole pieces and generally in the plane in which the group of strings is disposed. When an oscillating voltage from a separate source is applied to the opposite ends of each of the strings 10, the latter are caused to vibrate in the magnetic field between the pole pieces 11 in accordance with such oscillations. Each of the pole pieces is slotted, as shown at 15 and light from a suitable source 16, passed through a lens 17, is directed through the slots 15 in the pole pieces, the light beam being thereafter projected by means of a lens 18 and condensed along the length of the strip by a cylindrical lens 19 on the sensitized strip of paper 20 which is driven at a constant speed in the direction of its length. Thus when the strings 10 are caused to oscillate as described, their shadows are cast on the sensitized strip 20, and on development of the latter, a negative is produced in which the background is black and the record traces 22, representative of the movement of the several strings 10, are white.

The structure thus far described is entirely conventional, and the details thereof are not in the least significant but may be varied widely in the practice of the invention.

A shutter 25, preferably in the form of a rotating spoked wheel, is interposed in the optical system so that the spokes or blades thereof successively occlude the light beam as the shutter is rotated at a constant speed. This may be effected, for example, by mounting the shutter on the shaft of a synchronous motor which is driven by a constant frequency voltage generated by a vibrating bar or the like, to ensure that a precisely uniform speed will be maintained. For convenience the shutter 25 may comprise concentric annular supporting elements 26 and 27 of different diameter, the element 27 being mounted on a hub 28 by spokes 29 radiating therefrom. The element 26 is supported on the element 27 by one or more blades or spokes 30 which are disposed generally radially and are of sufficient length, when positioned so as to intersect the projected light beam, to cast a shadow which, when focussed on the sensitized strip by the cylindrical lens 19, extends entirely across the strip. Other blades 34, formed respectively on the elements 26 and 27 and likewise disposed generally radially, extend only partially across the space between the elements 26 and 27, and constitute in effect interrupted blades or spokes, the spacing between associated spoke ends being such that no shadow is cast thereby on the central portion of the sensitized strip over the major part of the width thereof. Preferably the blades 34 are of just sufficient length to cast a shadow only on the outermost traces at opposite sides of the strip, and are of less width than the blades 30 so that the shadows cast thereby are less pronounced. It is also frequently desirable to form one of the blades 30 of greater width so that certain intervals will be more readily identifiable, the remaining blade or blades 30 being of no greater width than the blades 34.

It will be appreciated that by means of an arrangement such as shown in Figures 1 and 2, a record strip of the type shown in Figure 3 may be produced, the strip being shown for convenience in Figure 3 as a positive print. It will be appreciated by an inspection of Figure 3, that the traces not intersected by the majority of the timing lines 24 may be observed and interpreted much more readily than the outermost traces which are intersected by all of the timing lines. It will further be appreciated that in the event the timing of any of the intermediate traces becomes a matter of importance, additional timing lines extending across the strip may readily be drawn in manually by laying a straight edge across the shorter lines at the opposite edges of the strip.

In Figure 4 I have shown one method of practicing the invention in conjunction with a multiple oscillograph of the rotating coil type in which light beams are reflected directly onto the sensitized strip to produce a positive print when developed. For the purpose of illustration I have shown a conventional representation of a recording system of this type, including a light source 40, and a plurality of moving elements 41, each of which may be constituted by a coil rotating in a magnetic field and bearing a mirror 42, whereby light from the source 40 may be reflected onto the sensitized strip 45. As in the previously described embodiment, the excitation of the rotating coils 41 from separate sources of operating voltage causes the coils to oscillate in a corresponding manner, the coil oscillations being projected onto the sensitized strip 45 to form the several traces.

With recording apparatus of this character, producing a positive record, the timing lines may be formed by projecting light from a source 48 through a shutter 49, which may comprise a rotating disc driven at a constant speed, onto the moving sensitized strip 45. The shutter may be constructed, as shown more particularly in Figure 5, as a flat disc having generally radial slits 50 therein, the length of these slits being such that the light beam from source 48 is projected across the entire width of the strip 45, and further slits 51 which are interrupted intermediate the ends thereof so that light passing therethrough exposes only a minor portion of the width of the strip, a record of the character shown in Figure 3 being thereby produced. As in the previously described embodiment, the slits 51 are preferably only of sufficient length to form lines intersecting the outermost record traces, and are narrower than the slits 50 so as to give prominence to the lines formed by the latter.

It will be understood from the foregoing description that my invention contemplates the use of various instrumentalities, the selection of which depends essentially on the nature of the oscillograph employed, for the formation on a multiple trace record strip of timing lines extending entirely across the strip, together with a greater number of timing lines, representing smaller time intervals, located intermediate the first named timing lines, and extending over a minor portion only of the strip adjacent each edge thereof.

Having thus described the invention, what is claimed as new and desired to be secured by Letters Patent is:

1. In apparatus for the multiple recording of seismic signals, means for feeding a sensitized strip in the direction of the length thereof, means to record on said strip a plurality of traces extending lengthwise of the strip, and timing mechanism for recording on said strip a succession of transverse lines representing equal time intervals with certain of said lines intersecting all of said traces and with the major number of said lines, disposed intermediate said first named lines, intersecting only those traces immediately adjacent each edge of the strip.

2. In apparatus for the multiple recording of seismic signals, means for feeding a sensitized strip in the direction of the length thereof, means to record on said strip a plurality of traces extending lengthwise of the strip, and timing mechanism for recording on said strip a succession of transverse lines representing equal time intervals with certain of said lines intersecting all of said traces and with the major number of said lines, disposed intermediate said first named lines, intersecting only those traces immediately adjacent each edge of the strip, said timing mechanism comprising a shutter device having light occluding portions movable across said optical system for periodically interrupting light transmission thereby.

3. In apparatus for the multiple recording of seismic signals, means for feeding a sensitized strip in the direction of the length thereof, means to record on said strip a plurality of traces extending lengthwise of the strip, and timing mechanism for recording on said strip a succession of transverse lines representing equal time intervals with certain of said lines intersecting all of said traces and with the major number of said lines, disposed intermediate said first named lines, intersecting only those traces immediately adjacent each edge of the strip, said timing mechanism comprising an optical system for projecting light on said strip to form said lines.

4. In apparatus for the multiple recording of seimic signals, means for feeding a sensitized strip in the direction of the length thereof, means to record on said strip a plurality of traces extending lengthwise of the strip, and timing mechanism for recording on said strip a succession of transverse lines representing equal time intervals with certain of said lines intersecting all of said traces and with the major number of said lines, disposed intermediate said first named lines, extending over a minor portion only of the width of the strip adjacent each edge of the latter.

5. In apparatus for the multiple recording of seismic signals, means for feeding a sensitized strip in the direction of the length thereof to record on said strip a plurality of traces extending lengthwise of the strip, and timing mechanism for recording on said strip a succession of transverse lines representing equal time intervals with certain of said lines intersecting all of said traces and with the major number of said lines, disposed intermediate said first named lines, extending over a minor portion only of the width of the strip adjacent each edge of the latter, said timing mechanism including a rotating shutter having light occluding blades arranged for movement across said optical system, certain of said blades intersecting in its entirety the light beam transmitted to said strip by said optical system, and the remaining blades, of greater number than said first named blades and disposed intermediate thereof, being interrupted so as to intersect the outer portions only of said transmitted beam.

6. In apparatus for the multiple recording of seismic signals, means for feeding a sensitized strip in the direction of the length thereof, means to record on said strip a plurality of traces extending lengthwise of the strip, and timing mechanism for recording on said strip a succession of transverse lines representing equal time intervals with certain of said lines intersecting all of said traces and with the major number of said lines, disposed intermediate said first named lines, extending over a minor portion only of the width of the strip adjacent each edge of the latter, said timing mechanism including means for projecting a light beam onto said strip, and a rotating shutter having generally radial slits through which said light beam is passed, certain of said slits being of such length as to permit said light beam to fall on said strip across the entire width of the latter, and certain other slits, of greater number than said first named slits and disposed intermediate thereof, being interrupted so as to permit the light beam to fall on the outer portions only of the strip.

LORENZO MANZANERA.